United States Patent

Preston et al.

[11] Patent Number: 6,006,602
[45] Date of Patent: Dec. 28, 1999

[54] WEIGHT MEASUREMENT AND MEASUREMENT STANDARDIZATION SENSOR

[75] Inventors: John Preston, Los Altos; Lee Chase, Los Gatos; Hung-Tzaw Hu, Saratoga; John D. Goss, San Jose, all of Calif.

[73] Assignee: Honeywell-Measurex Corporation, Cupertino, Calif.

[21] Appl. No.: 09/070,165

[22] Filed: Apr. 30, 1998

[51] Int. Cl.[6] ....................................................... G01L 5/04
[52] U.S. Cl. ............................................. 73/159; 162/198
[58] Field of Search .................. 73/159, 73; 364/471.01; 162/198, 263; 324/95

[56] References Cited

U.S. PATENT DOCUMENTS

| | | |
|---|---|---|
| 3,260,642 | 7/1966 | Canter et al. . |
| 3,593,128 | 7/1971 | Perry . |
| 3,630,836 | 12/1971 | Bietry et al. . |
| 3,636,327 | 1/1972 | Troutman . |
| 3,646,434 | 2/1972 | Norwich . |
| 3,654,075 | 4/1972 | Keyes et al. . |
| 3,666,621 | 5/1972 | Adams ..................................... 162/198 |
| 3,713,966 | 1/1973 | Lippke . |
| 3,723,865 | 3/1973 | Batey et al. . |
| 3,795,984 | 3/1974 | Meyer . |
| 3,811,087 | 5/1974 | Schmelzer . |
| 3,864,626 | 2/1975 | MacLean et al. . |
| 3,986,110 | 10/1976 | Overall et al. . |
| 4,135,151 | 1/1979 | Rogers et al. . |
| 4,259,632 | 3/1981 | Ahtiainen . |
| 4,314,878 | 2/1982 | Lee . |
| 4,329,201 | 5/1982 | Bolton . |
| 4,369,080 | 1/1983 | Johnson . |
| 4,398,996 | 8/1983 | Bolton et al. . |
| 4,468,611 | 8/1984 | Tward . |
| 4,474,643 | 10/1984 | Lindblad . |
| 4,514,812 | 4/1985 | Miller et al. . |
| 4,580,233 | 4/1986 | Parker et al. . |
| 4,588,943 | 5/1986 | Hirth . |
| 4,613,406 | 9/1986 | Gess . |
| 4,680,089 | 7/1987 | Aral et al. . |
| 4,692,616 | 9/1987 | Hegland et al. . |
| 4,707,779 | 11/1987 | Hu . |
| 4,748,400 | 5/1988 | Typpo . |
| 4,786,529 | 11/1988 | Boissevain . |
| 4,791,353 | 12/1988 | Typpo . |
| 4,817,021 | 3/1989 | Sowerby et al. . |
| 4,827,121 | 5/1989 | Vidrine, Jr. et al. . |
| 4,840,706 | 6/1989 | Campbell . |
| 4,845,421 | 7/1989 | Howarth et al. . |
| 4,903,528 | 2/1990 | Balakrishnan et al. . |
| 4,909,070 | 3/1990 | Smith . |
| 4,921,574 | 5/1990 | Hu . |
| 4,924,172 | 5/1990 | Homgren . |

(List continued on next page.)

FOREIGN PATENT DOCUMENTS 0276106   7/1988   European Pat. Off. .

*Primary Examiner*—Hezron Williams
*Assistant Examiner*—Thuy Vinh Tran
*Attorney, Agent, or Firm*—Burns, Doane, Swecker & Mathis, L.L.P.

[57] ABSTRACT

An apparatus and method for obtaining fiber weight measurements in the wet end of a sheetmaking system and for verifying fiber weight measurements taken in the wet end of a sheetmaking system which includes a water weight sensor positioned beneath the wire in the wet end of the sheetmaking system for obtaining water weight measurements and load cells residing beneath the water weight sensor for weighing the wet end sensor and the wire with wetstock (total weight) and without wetstock (tare weight). In one embodiment, the water weight measurement and the tare weight measurement are subtracted from the total weight to obtain the fiber weight in the wetstock. In another embodiment, the water weight measurement is used to obtain an predicted fiber weight measurement and the determined fiber weight is used to verify the predicted fiber weight measurement and the accuracy of the water weight measurement device.

20 Claims, 6 Drawing Sheets

U.S. PATENT DOCUMENTS

| | | |
|---|---|---|
| 4,986,410 | 1/1991 | Shields . |
| 4,990,261 | 2/1991 | Ho . |
| 4,994,145 | 2/1991 | Seymour . |
| 5,013,403 | 5/1991 | Chase . |
| 5,020,469 | 6/1991 | Boissevain et al. . |
| 5,021,740 | 6/1991 | Sarr et al. . |
| 5,022,966 | 6/1991 | Hu . |
| 5,045,798 | 9/1991 | Hendrick . |
| 5,052,223 | 10/1991 | Regnault et al. . |
| 5,067,345 | 11/1991 | Mougne . |
| 5,093,795 | 3/1992 | Lewis . |
| 5,122,754 | 6/1992 | Gotaas . |
| 5,124,552 | 6/1992 | Anderson . |
| 5,132,631 | 7/1992 | Klopfenstein et al. . |
| 5,134,380 | 7/1992 | Jonas . |
| 5,170,128 | 12/1992 | Masurat et al. . |
| 5,170,670 | 12/1992 | Fasching . |
| 5,177,445 | 1/1993 | Cross . |
| 5,198,777 | 3/1993 | Masuda et al. . |
| 5,206,599 | 4/1993 | Mayer . |
| 5,208,544 | 5/1993 | McBrearty et al. . |
| 5,225,785 | 7/1993 | Mayer et al. . |
| 5,241,280 | 8/1993 | Aidun et al. . |
| 5,247,261 | 9/1993 | Gershenfeld . |
| 5,262,955 | 11/1993 | Lewis . |
| 5,270,664 | 12/1993 | McMurtry et al. . |
| 5,340,442 | 8/1994 | Gess et al. . |
| 5,400,247 | 3/1995 | He . |
| 5,450,015 | 9/1995 | Mastico et al. . |
| 5,492,601 | 2/1996 | Ostermayer et al. . |
| 5,493,910 | 2/1996 | Hall et al. . |
| 5,539,634 | 7/1996 | He . |
| 5,561,599 | 10/1996 | Lu . |
| 5,563,809 | 10/1996 | Williams et al. . |
| 5,636,126 | 6/1997 | Heaven et al. . |
| 5,658,432 | 8/1997 | Heaven et al. . |
| 5,853,543 | 12/1998 | Hu et al. ................................ 162/198 |

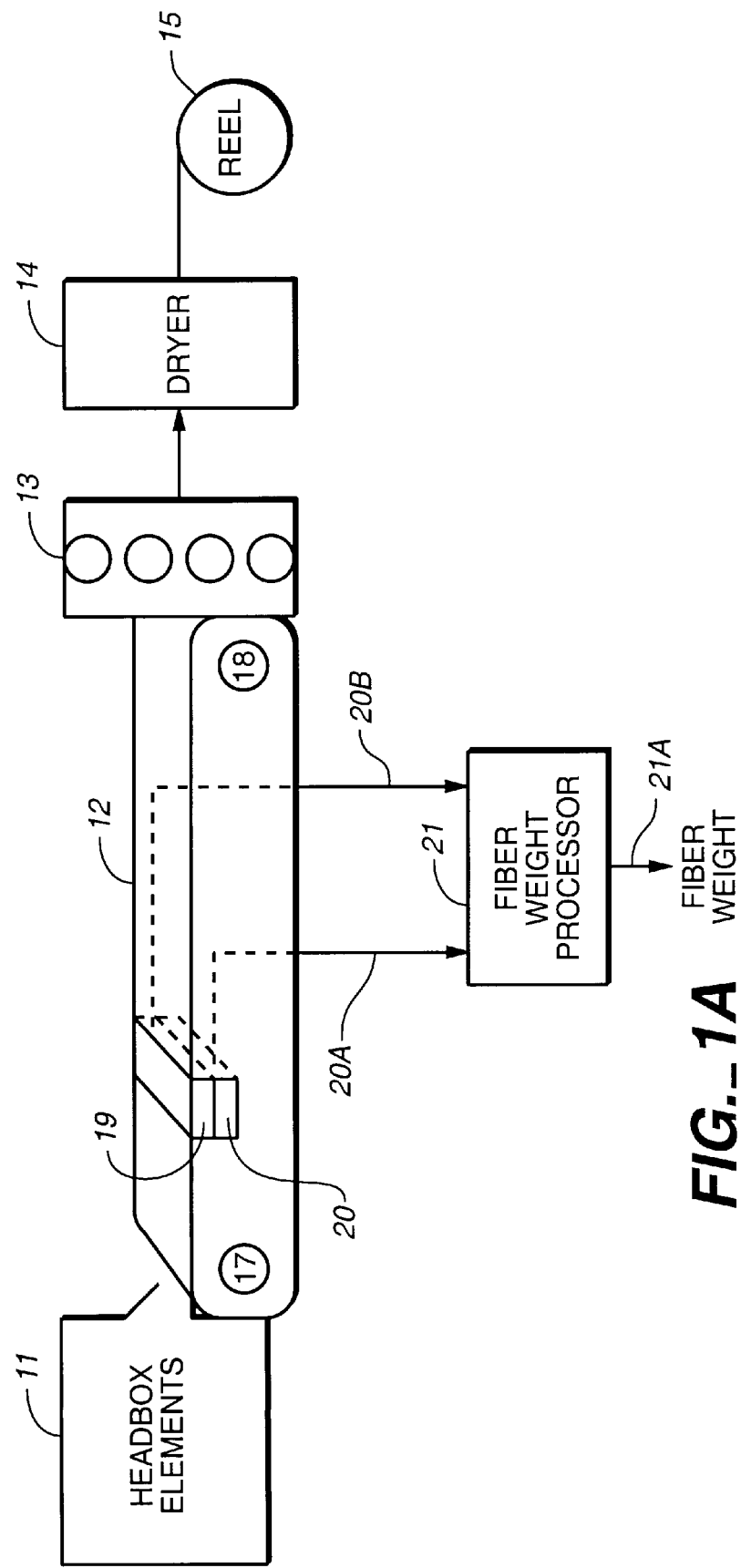
FIG._1A

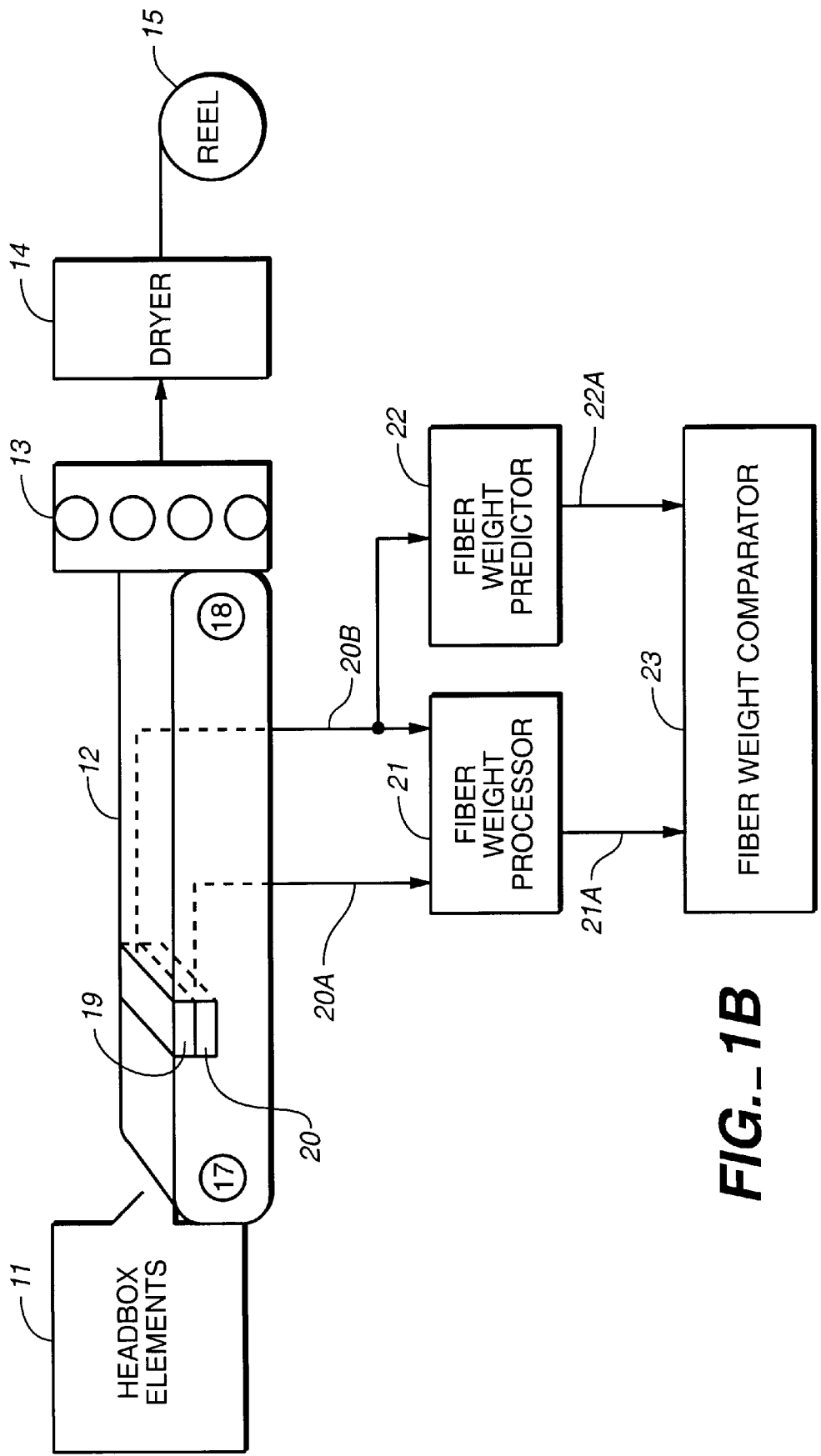
FIG._1B

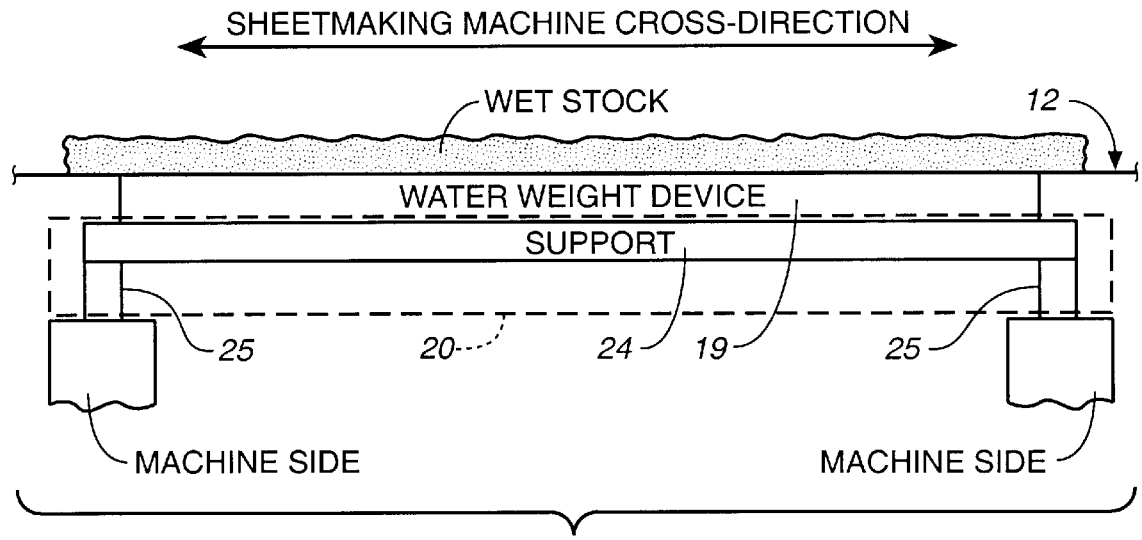
FIG._2A
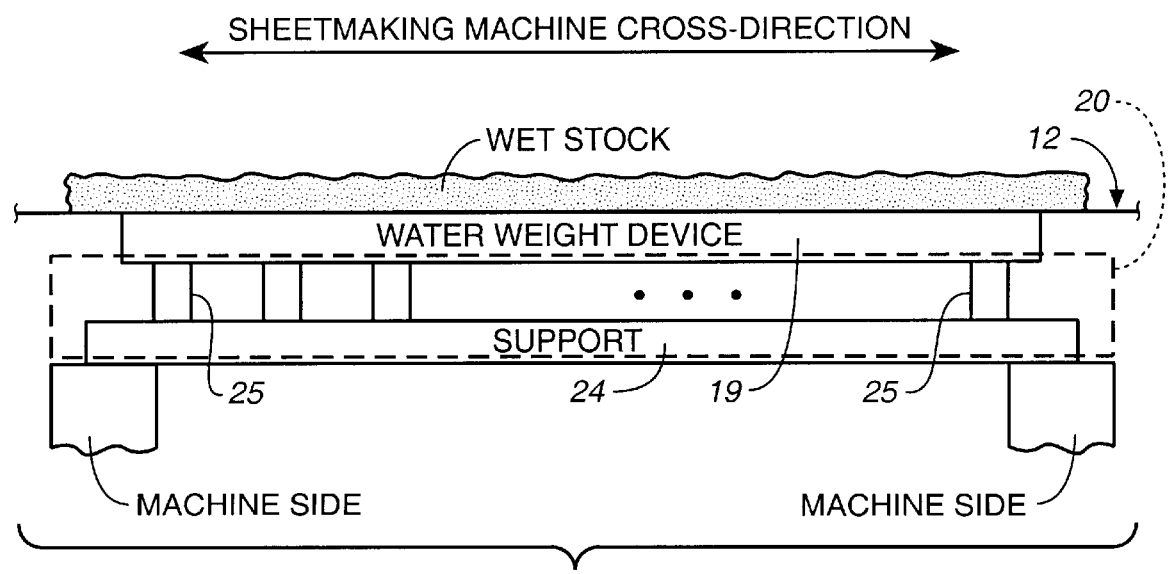
FIG._2B

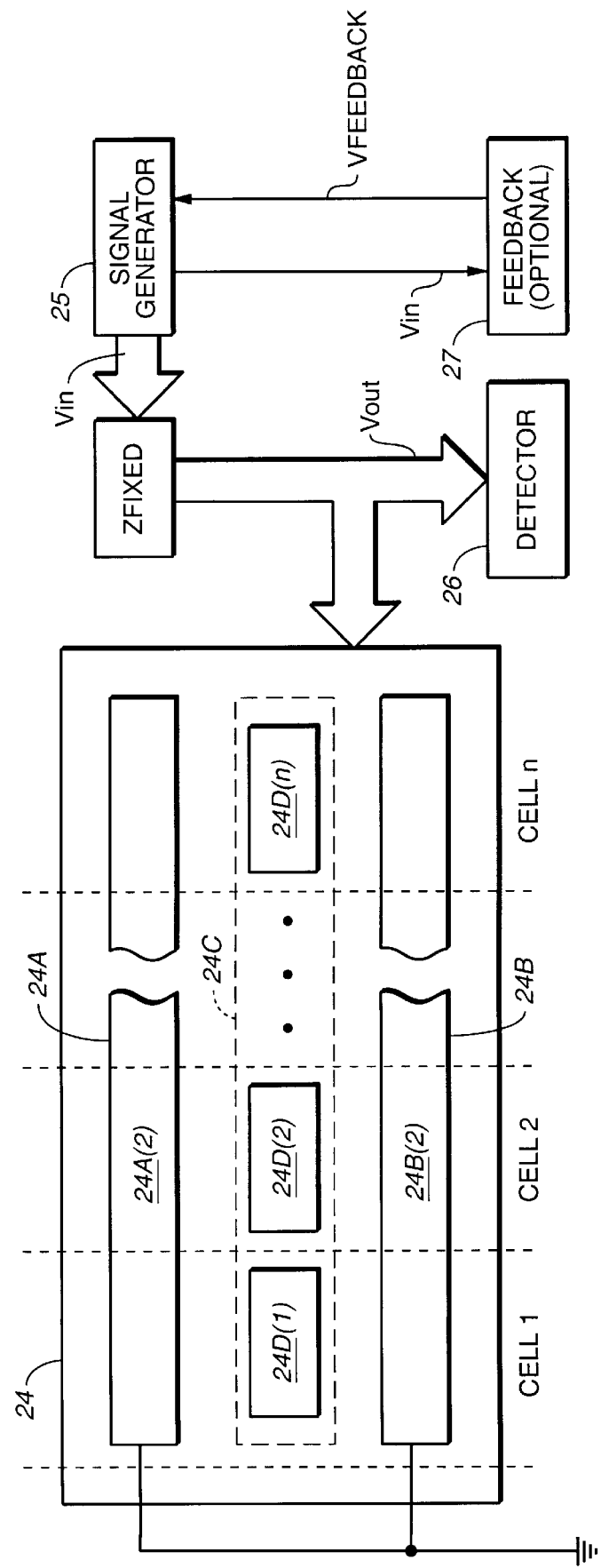
FIG._3

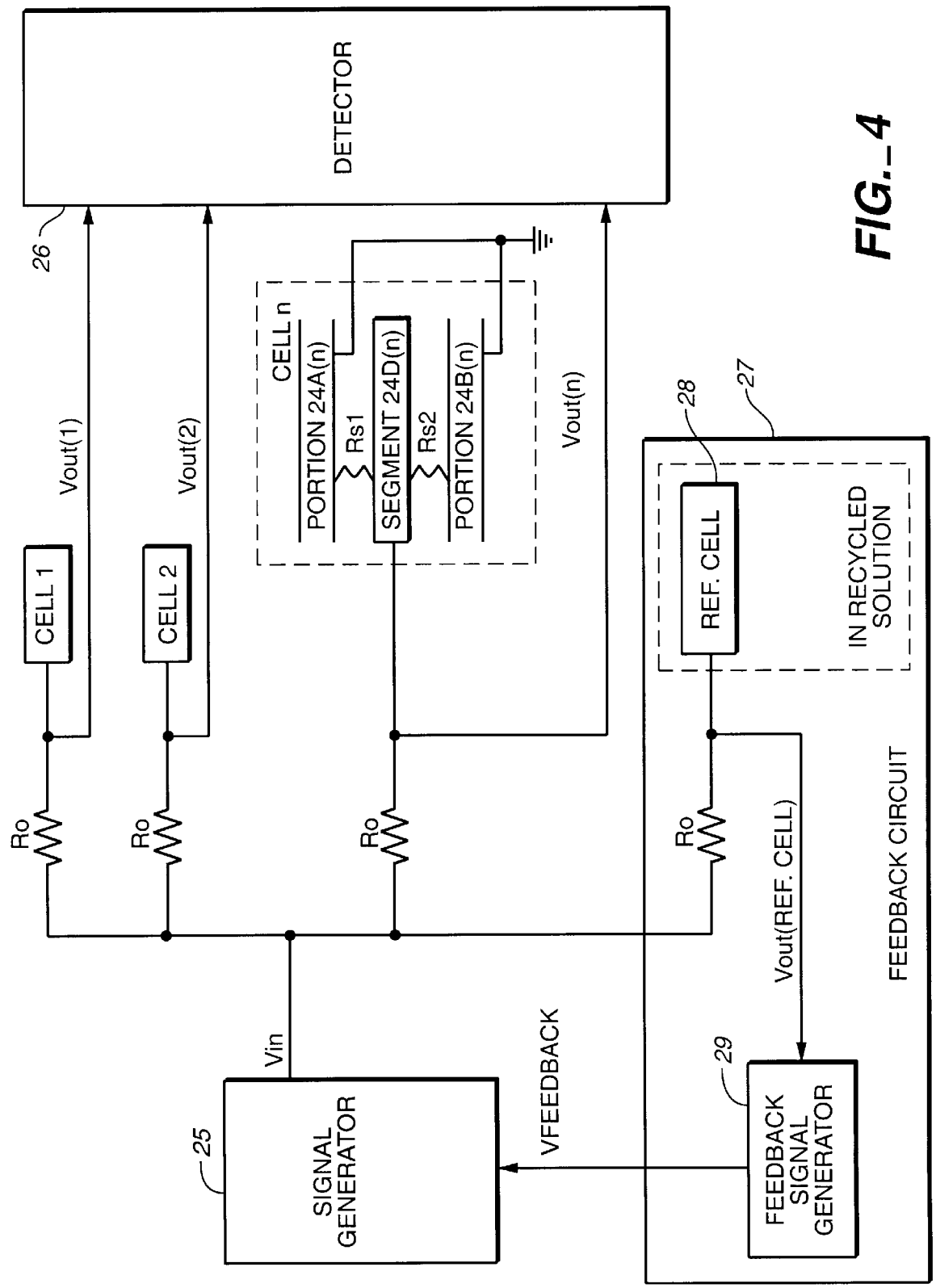
FIG._4

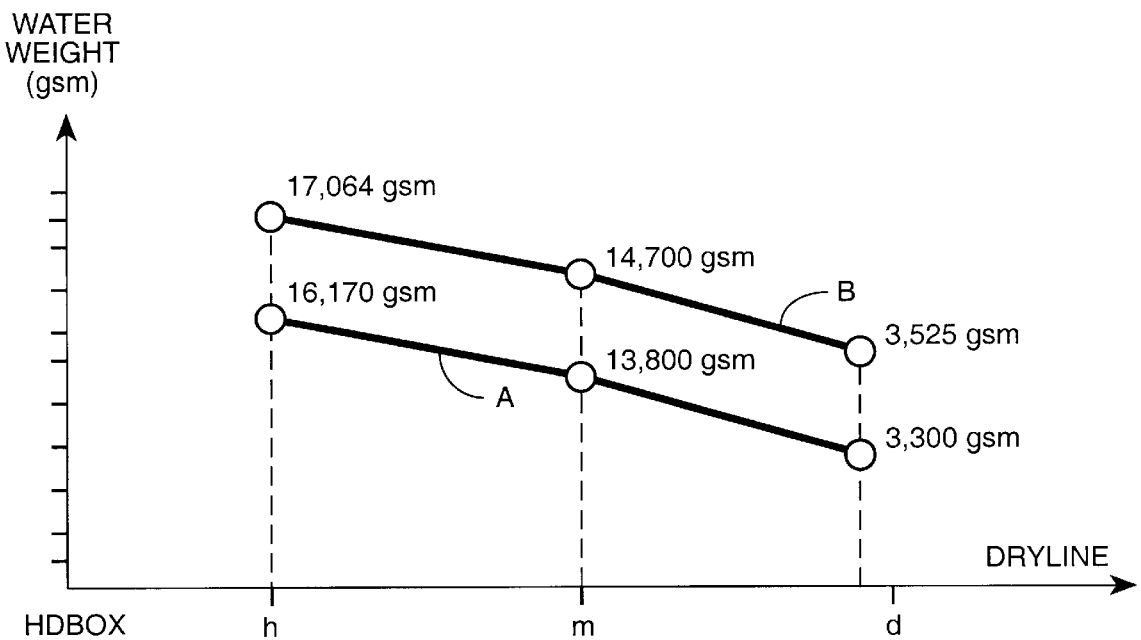
FIG._5
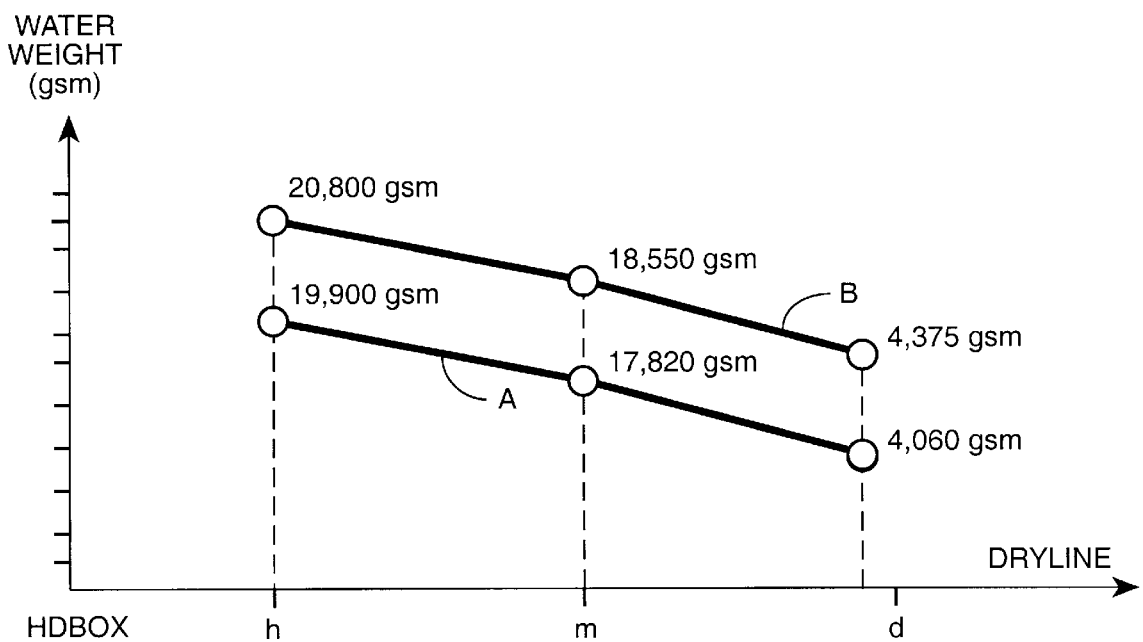
FIG._6

WEIGHT MEASUREMENT AND MEASUREMENT STANDARDIZATION SENSOR

BACKGROUND OF THE INVENTION

1. Field of The Invention

The present invention relates to measuring fiber weight in a continuous sheetmaking machine process, and more particularly, to a sensor for monitoring fiber weight on the wire of a sheetmaking machine.

2. State of The Art

In the manufacture of paper using a continuous sheetmaking machine, a web of paper is formed from an aqueous suspension of fibers (stock). Stock is dispersed from a dispensing unit referred to as a headbox onto a traveling mesh wire or fabric and water drains by gravity and vacuum suction through the fabric. The web is then transferred to the pressing section where more water is removed by dry felt and pressure. The web next enters the dry section where steam heated dryers complete the drying process. The sheetmaking machine is essentially a de-watering, i.e., water removal system. In the sheetmaking art, the term machine direction (MD) refers to the direction that the sheet material travels during the manufacturing process, while the term cross direction (CD) refers to the direction across the width of the sheet which is perpendicular to the machine direction. Furthermore, in general, the elements of the system including the headbox, the web, and those sections just before the dryer are referred to as the "wet end". The "dry end" generally includes the sections downstream from the dryer. Papermaking elements and machines are well known in the art and are described, for example, in "Handbook for Pulp & Paper Technologists" 2nd ed., G. A. Smook, 1992, Angus Wilde Publications, Inc., and "Pulp and Paper Manufacture" Vol III (Papermaking and Paperboard Making), R. MacDonald, ed. 1970, McGraw Hill. Sheetmaking machines are further described, for example, in U.S. Pat. Nos. 5,539,634, 5,022,966 4,982,334, 4,786,817, and 4,767,935.

In the art of making paper, sheet properties (such as sheet strength, thickness, and weight) are continually monitored and the sheetmaking machine controlled and adjusted to assure sheet quality and to minimize the amount of finished product that is rejected. This control is performed by measuring sheet properties at various stages in the manufacturing process which most often include basis weight, moisture content, and caliper (i.e., thickness) of the sheet.

Typically, a scanning sensor is used to perform basis weight measurements of the finished sheet at the dry end of the sheetmaking machine. Scanning sensors are known in the art and are described, for example, in U.S. Pat. Nos. 5,094,535, 4,879,471, 5,315,124, and 5,432,353. The basis weight measurements obtained from the scanner are used to control elements in the sheetmaking machine to adjust basis weight, and hence, paper quality.

There are several problems related to scanning type sensors. In particular, to date scanning sensors have been positioned at or in close proximity to the dry end of the sheetmaking machine. One reason for this is that the scanning measurement equipment cannot tolerate the harsh conditions within the wet end of the sheetmaking machine. Since the scanning sensors are located near the end of the paper making process, process variations occurring at the beginning of the sheetmaking machine in the wet end (i.e., on the wire) are not detected until the final paper is scanned at the dry end. As a result, any paper produced within that time period will potentially have degraded quality. Additionally, since scanning sensors obtain fiber or basis weight measurement readings as the sheet travels along the machine, the actual sensor measurements are taken on a diagonal path. As a result, the measurement readings obtained from a scanning sensor are inter-related machine direction (MD) and cross direction (CD) weight readings. In order to decouple the cross and machine direction weight information, the scanned data is often averaged and processed along with other scanned data readings to obtain an approximation of the MD and CD weight measurements of the paper. This processing also takes time, thereby adding to the overall delay in obtaining feedback data for monitoring process variation and adjusting the sheetmaking machine.

What would be desirable is to obtain fiber weight readings closer to the beginning of the sheetmaking process in a reliable manner.

SUMMARY OF THE INVENTION

The present invention is an apparatus and method for measuring fiber weight in the wet-end of a sheetmaking machine and for using the measured fiber weight to verify a predicted fiber weight obtained from water weight measurements performed in the wet end. One embodiment of the apparatus for measuring fiber weight includes a measuring apparatus having an underwire water weight measurement device and a total weight measurement device which resides under and supports the weight of the water weight measurement device and the wire of the sheetmaking machine. The total weight measurement device is used to initially weigh the total weight of the water weight measurement device and the wire without the wetstock to obtain a tare weight (TARE Wt) measurement in a non-production environment. Once the sheetmaking machine is in a production mode, the total weight measurement device is used to weigh the water weight measurement device and the wire with wetstock to obtain a total weight (TOTAL Wt) measurement. The water weight measurement device is used to obtain a water weight (WATER Wt) measurement. A fiber weight processor is used to determine fiber weight (FIBER Wt) using the total weight measurement, the tare weight measurement, and the water weight measurement and in particular, the tare weight and the water weight are subtracted from the total weight to obtain the fiber weight (i.e., FIBER Wt=TOTAL Wt−TARE Wt−WATER Wt).

One embodiment of the apparatus for verifying a predicted fiber weight (PREDICTED FIBER Wt) obtained from water weight measurements performed in the wet end includes a measuring apparatus having an underwire water weight measurement device and a total weight measurement device which resides under and supports the weight of the water weight measurement device and the wire of the sheetmaking machine. The total weight measurement device and the water weight measurement device are used to determine the tare weight, the total weight, and the water weight. A fiber weight processor determines fiber weight by subtracting the tare and water weights from the total weight. In addition, the water weight is used to generate a predicted fiber weight. The determined fiber weight is then used to verify the accuracy of the predicted fiber weight.

In one embodiment, the measurement apparatus includes an under wire water weight measurement device which resides on a support beam. Attached beneath the support beam are load cells attached to the sides of the sheetmaking machine which support the total weight of the wire (with or without the wetstock), the water weight measurement device, and the support beam. The load cells function to output a signal proportional to the weight that it supports. In one embodiment, the load cells are strain gauges.

In anther embodiment, the measurement apparatus includes the under wire water weight measurement device having at least one load cell residing beneath it. The load cell or cells are supported by a support beam that is attached to the sheetmaking machine. In this embodiment, the total weight measurement device weighs the wire (with or without the wetstock) and the water weight measurement device to obtain the tare weight (without wetstock) or the total weight (with wetstock) measurement.

In one embodiment of the present invention the water weight measurement device includes an under wire water weight ($UW^3$) sensor having a plurality of cells each for sensing the water weight at a given point along the cross direction of the sheetmaking machine.

BRIEF DESCRIPTION OF THE DRAWINGS

The present invention may be further understood from the following written description in conjunction with the appended drawings. In the drawings:

FIG. 1A shows a sheetmaking machine including a measurement apparatus for measuring fiber weight;

FIG. 1B shows a sheetmaking machine including a measurement apparatus for measuring fiber weight and verifying a predicted fiber weight;

FIG. 2A shows a first embodiment of the measurement apparatus of the present invention;

FIG. 2B shows a second embodiment of the measurement apparatus of the present invention;

FIG. 3 shows a block diagram of one embodiment of a wet end water weight measurement device;

FIG. 4 shows an electrical block diagram of one embodiment of a wet end water weight measurement device.

FIG. 5 shows a graph of water weight versus wire position of a papermaking machine with different consistency in the stock used in a drystock bump test; and FIG. 6 shows a graph of water weight versus position of a papermaking machine with different refiner power used in a freeness test.

DETAILED DESCRIPTION OF THE PREFERRED EMBODIMENTS

The present invention is a method and apparatus of measuring fiber weight in wetstock in the wet end of a sheetmaking machine and a method and apparatus of using the measured fiber weight to verify a predicted fiber weight obtained using wet-end water weight measurements.

FIG. 1A shows an embodiment of a sheetmaking machine for producing a continuous sheet of material including a measurement apparatus for determining fiber weight in the wet end of the system. The system includes at least a headbox 11, web or wire 12, calendaring stack 13, dryer 14, and reel 15. Actuators (not shown) in headbox 11 discharge wetstock onto supporting wire 12 which rotates between rollers 17 and 18. Water is removed through wire 12 by vacuum and gravity. The calendaring stack 13 removes more water by felt and pressure. The dryer 14 finishes the drying process using steam heated dryers. The finished sheet is collected on reel 15.

The apparatus for measuring fiber weight includes a water weight measurement device 19, a total weight measurement device 20, and a fiber weight processor 21. In accordance with one method of the present invention, fiber weight is determined in the wet-end of the sheetmaking machine and, in particular, under the wire of the sheetmaking machine by using the water weight measurement device 19 to measure the weight of the water (WATER Wt) in the wetstock on top of the wire 12 above device 19. The total weight measurement device measures, in a first case, the tare weight (TARE Wt) consisting of the weight of the measurement device 19, the wire 12 without wetstock, and any other elements residing above device 20 and, in a second case, the total weight (TOTAL Wt) consisting of the weight of the measurement device 19, the wire with the wetstock on the wire 12, and any other devices above device 20. The total weight, the tare weight, and the water weight are provided to a fiber weight processor 21 which subtracts the tare weight and the water weight from the total weight to obtain the fiber weight (i.e. FIBER Wt=TOTAL Wt−TARA Wt−WATER Wt). In accordance with one embodiment of the method of the present invention, the total weight measurement device 20 obtains the tare weight which includes at least the weight of the water weight measurement device 19 and the wire 12 without the wetstock in a non-production mode. This weight measurement is stored by the fiber weight processor 21. Once the sheetmaking machine is in a production mode, a total weight (i.e. wire 12 with wetstock) as well as a water weight are obtained on an on-line basis. Fiber weight is then determined using the on-line total weight and water weight measurements and the previously determined tare weight measurement.

It should be noted that the position of devices 19 and 20 relative to the wire 12 between rolls 17 and 18 is not indicative of a specific placement. Instead, the sensor can be placed anywhere along the wire in which the wetstock is in a state such that all or most of the water is held by the fiber in the wetstock. In addition, The term "water weight" refers to the mass or weight of water per unit area of the wet paper stock which is on the wire.

FIG. 2A shows a first embodiment of the measurement apparatus in accordance with the apparatus of the present invention. The apparatus includes a measurement device 20 having a support 24 residing beneath the water weight measurement device 19 and load cells 25 residing beneath support 24. The load cells are attached to the sides of the sheetmaking machine such that they support the weight of wire 12 (with or without wetstock), the water weight measurement device 19, and support 24. In general, load cells 25 can comprise a variety of different loading devices, however, it should be understood that the load cells function to output a voltage signal that is proportional to the weight that they support. An example of a load cell implementation is a strain gauge. Nominally, the weight is uniformly distributed among the load cells. Hence in the case of two load cells, each would support half the weight. Alternatively, the output of each load cell can be used to determine the distribution of the weight on the wire. In one embodiment, the water weight measurement device 19 includes a sensor made-up of an array of measurement cells spaced across the CD of the sheetmaking machine as described herein. The tare weight on each cell is determined with no stock on the wire. The weight measured with stock less the tare weight gives water weight for the section supported by the cell. The sum of all cells give the total weight.

FIG. 2B shows a second embodiment of the measurement apparatus in accordance with the apparatus of the present invention. In this embodiment the load cells 25 reside directly beneath the water weight sensor and are supported by support 24 which is then attached to the sides of the sheetmaking machine. As a result, a plurality of load cells 25 can be positioned along support 24 resulting in a distributed weight measurement. As with the previous embodiment, the weight is evenly distributed among the plurality of load cells or the weight distribution is determined from the output of the load cells. In this embodiment, the load cells measure the weight of the water weight measurement device 19 and the wire 12 (with or without wetstock).

FIG. 1B shows an embodiment of a sheetmaking machine for producing a continuous sheet of material including a measurement apparatus for determining fiber weight in the wet end of the system and for using this fiber weight measurement to verify a predicted fiber weight obtained using water weight measurements. The sheetmaking machine includes the conventional elements of a sheetmaking machine as shown in FIG. 1A (i.e., headbox 11, wire 12 etc.) In addition the sheetmaking machine includes measurement apparatus having a water weight measurement device 19 and a total weight measurement device 20. The water weight measurement device 19 provides a water weight measurement 20B. The water weight measurement is used to predict fiber weight using fiber weight predictor 22 as described herein to obtain a predicted fiber weight 22A. In addition, the water weight measurement 20B, along with the total weight and the tare weight as provided by total weight measurement device 20, is used to determine a fiber weight 21A by fiber weight processor 21. The predicted fiber weight 22A as determined by the fiber weight predictor 22 and the determined fiber weight 21A as determined by fiber weight processor 21−+ are compared by fiber weight comparator 23 to evaluate the accuracy of the predicted fiber weight measurement.

In one embodiment, the water weight measurement device is an under wire water weight ($UW^3$) measurement apparatus as described herein.

Under wire water weight ($UW^3$) sensor and apparatus

The following describes a preferred water weight measurement device. FIG. 3 shows a water weight measurement system, described in U.S. patent application Ser. No. 08/766,864 assigned to the assignee of the present application which in one embodiment measures the conductivity of the water in the stock material using a sensor array having a first configuration. The conductivity of the water is proportional to the water weight. A sensor array includes two elongated grounded electrodes 24A and 24B and a segmented electrode 24C. Measurement cells (cell1, cell2, . . . celln) each include a segment of electrode 24C and a corresponding portion of the grounded electrodes (24A and 24B) opposite the segment. Each cell detects the conductivity of the paper stock and specifically the water portion of the stock residing in the space between the segment and its corresponding opposing portions of grounded electrode.

Each cell is independently coupled to an input voltage (Vin) from signal generator 25 through an impedance element Zfixed and each provides an output voltage to voltage detector 26 on bus Vout. Signal generator 25 provides Vin.

Detector 26 includes circuitry for detecting variations in voltage from each of the segments in electrodes 24C and any conversion circuitry for converting the voltage variations into useful information relating to the physical characteristics of the aqueous mixture. Optional feedback circuit 27 includes a reference cell having similarly configured electrodes as a single cell within the sensor array. The reference cell functions to respond to unwanted physical characteristic changes in the aqueous mixture other than the physical characteristic of the aqueous mixture that is desired to be measured by the array. For instance, if the sensor is detecting voltage changes due to changes in weight, the reference cell is configured so that the weight remains constant. Consequently, any voltage/conductivity changes exhibited by the reference cell are due to aqueous mixture physical characteristics other than weight changes (such as temperature and chemical composition). The feedback circuit uses the voltage changes generated by the reference cell to generate a feedback signal (Vfeedback) to compensate and adjust Vin for these unwanted aqueous mixture property changes (to be described in further detail below). It should also be noted that the non-weight related aqueous mixture conductivity information provided by the reference cell may also provide useful data in the sheetmaking process.

The sensor array is sensitive to three physical properties of the material being detected: the conductivity or resistance, the dielectric constant, and the proximity of the material to the sensor. Depending on the material, one or more of these properties will dominate. The material capacitance depends on the geometry of the electrodes, the dielectric constant of the material, and its proximity to the sensor. For a pure dielectric material, the resistance of the material is infinite (i.e.,Rm=∞) between the electrodes and the sensor measures the dielectric constant of the material. Alternatively, for a highly conductive material, the resistance of the material is much less than the capacitive impedance (i.e., Rm $<<Z_{Cm}$), and the sensor measures the conductivity of the material..

FIG. 4 illustrates an electrical representation of a measuring apparatus including cells 1–n of sensor array 24 for measuring conductivity of an aqueous material. As shown, each cell is coupled to Vin from signal generator 25 through an impedance element which, in this embodiment, is resistive element Ro. Referring to cell n, resistor Ro is coupled to center segment 24D(n) and portions 24A(n) and 24B(n) (opposite segment 24D(n)) are coupled to ground. Also shown in FIG. 6 are resistors Rs1 and Rs2 which represent the conductance of the aqueous mixture between the segments and the grounded portions. Resistors Ro, Rs1, and Rs2 form a voltage divider network between Vin and ground.

The measuring apparatus shown in FIG. 4 is based on the concept that the conductivity of the voltage divider network Rs1 and Rs2 of the aqueous mixture and the weight/amount of an aqueous mixture are inversely proportional. Consequently, as the weight increases/decreases, the combination of Rs1 and Rs2 decreases/increases. Changes in Rs1 and Rs2 cause corresponding fluctuations in the voltage Vout as dictated by the voltage divider network. The voltage Vout from each cell is coupled to detector 26. Hence, variations in voltage inversely proportional to variations in conductivity of the aqueous mixture are detected by detector 26 thereby providing information relating to the weight and amount of aqueous mixture in the general proximity above each cell. Detector 26 also typically includes other circuitry for converting the output signals from the cell into information representing particular characteristics of the aqueous mixture.

FIG. 4 also shows feedback circuit 27 including reference cell 28 and feedback signal generator 29. The concept of the feedback circuit 27 is to isolate a reference cell such that it is affected by aqueous mixture physical characteristic changes other than the physical characteristic that is desired to be sensed by the system. For instance, if weight is desired to be sensed then the weight is kept constant so that any voltage changes generated by the reference cell are due to physical characteristics other than weight changes. In one embodiment, reference cell 28 is immersed in an aqueous mixture of recycled water which has the same chemical and temperature characteristics of the water in which sensor array 24 is immersed in. Hence, any chemical or temperature changes affecting conductivity experienced by array 24 is also sensed by reference cell 28. Furthermore, reference cell 28 is configured such that the weight of the water is held constant. As a result voltage changes Vout(ref. cell) generated by the reference cell 28 are due to changes in the conductivity of the aqueous mixture, caused from characteristic changes other than weight. Feedback signal generator 29 converts the undesirable voltage changes produced from the reference cell into a feedback signal that either increases or decreases Vin and thereby cancels out the affect of erroneous voltage changes on the sensing system. For instance, if the conductivity of the aqueous mixture in the array increases due to a temperature increase, then Vout(ref. cell) will decrease causing a corresponding increase in the feedback signal. Increasing Vfeedback increases Vin which, in turn, compensates for the initial increase in conductivity of the aqueous mixture due to the temperature change. As a result, Vout from the cells only change when the weight of the aqueous mixture changes.

Predicting Dry end Basis Weight From Measurements of $UW^3$ Sensors

The following describes a preferred method of predicting the dry stock weight using the $UW^3$ sensors. In particular, the paper produced involves simultaneous measurements of (1) the water contents of the paper stock on the fabric or wire of the papermaking machine at three or more locations along the machine direction of the fabric and of (2) the dry stock weight of the paper product preceding the paper stock on the fabric. In this fashion, the expected dry stock weight of the paper that will be formed by the paper stock on the fabric can be determined at that instance.

Specifically, the method of predicting the dry stock weight of a sheet of material that is moving on a water permeable fabric of a de-watering machine that includes the steps of:

a) placing three or more water weight sensors adjacent to the fabric wherein the sensors are positioned at different locations in the direction of movement of the fabric and placing a sensor to measure the moisture content of the sheet of material after being substantially de-watered;

b) operating the machine at predetermined operating parameters and measuring the water weights of the sheet of material at the three or more locations on the fabric with the water weight sensors and simultaneously measuring the dry weight apart of the sheet of material that has been substantially de-watered;

c) performing bump tests to measure changes in water weight in response to perturbations in three or more operating parameters wherein each bump test is performed by alternately varying one of the operating parameters while keeping the others constant, and calculating the changes in the measurements of the three or more water weight sensors and wherein the number of bump tests correspond to the number of water weight sensors employed;

d) using calculated changes in the measurements from step c) to obtain a linearized model describing changes in the three or more water weight sensors as a function of changes in the three or more operating parameters about said predetermined operating parameters wherein this function is expressed as an N×N matrix wherein N is equal to the number of water weight sensors employed; and e) developing a functional relationship between water weight measurements from the three or more water weight sensors for a segment of the moving sheet of material at the fabric and the predicted moisture level for the segment after being substantially de-watered.

Preferably, the bump tests comprise varying the flow rate of the aqueous fiber stock onto the fabric, freeness of the fiber stock, and concentration of fiber in the aqueous fiber stock. With the present invention, by continuously monitoring the water weight levels of the paper stock on the fabric, it is possible to predict the quality (i.e., dry stock weight) of the product. Furthermore, feedback controls can be implemented to change one or more operating parameters in response to fluctuations in predicted dry stock weight.

The water drainage profile on a fourdrinier wire is a complicated function principally dependent on the arrangement and performance of drainage elements, characteristics of the wire, tension on the wire, stock characteristics (for example freeness, pH and additives), stock thickness, stock temperature, stock consistency and wire speed. It has demonstrated that particularly useful drainage profiles can be generated by varying the following process parameters: 1) total water flow which depends on, among other things, the head box delivery system, head pressure and slice opening and slope position, 2) freeness which depends on, among other things, the stock characteristics and refiner power; and 3) dry stock flow and headbox consistency.

Water weight sensors placed at strategic locations along the paper making fabric can be used to profile the de-watering process (hereinafter referred to as "drainage profile"). By varying the above stated process parameters and measuring changes in the drainage profile, one can then construct a model which simulates the wet end paper process dynamics. Conversely one can use the model to determine how the process parameters should be varied to maintain or produce a specified change in the drainage profile. Furthermore with the present invention the dry stock weight of the web on the paper making fabric can be predicted from the water weight drainage profiles.

Three water weight sensors measure the water weight of the paper stock on the fabric. The position along the fabric at which the three sensors are located are designated "h", "m", and "d", respectively, in FIGS. 5 and 6. More than three water weight sensors can be employed. It is not necessary that the sensors be aligned in tandem, the only requirement is that they are positioned at different machine directional positions. Typically, readings from the water weight sensor at location "h" which is closest to the head box will be more influenced by changes in stock freeness than in changes in the dry stock since changes in the latter is insignificant when compared to the large free water weight quantity. At the middle location "m", the water weight sensor is usually more influenced by changes in the amount of free water than by changes in the amount of dry stock. Most preferably location "m" is selected so as to be sensitive to both stock weight and free changes. Finally, location "d", which is closest to the drying section, is selected so that the water weight sensor is sensitive to changes in the dry stock because at this point of the de-water process the amount of water bonded to or associated with the fiber is proportional to the fiber weight. This water weight sensor is also sensitive to changes in the freeness of the fiber although to a lesser extent. Preferably, at position "d" sufficient amounts of water have been removed so that the paper stock has an effective consistency whereby essentially no further fiber loss through the fabric occurs.

In measuring paper stock, the conductivity of the mixture is high and dominates the measurement of the sensor. The proximity is held constant by contacting the support web in the papermaking system under the paper stock. The conductivity of the paper stock is directly proportional to the total water weight within the wetstock, consequently providing information which can be used to monitor and control the quality of the paper sheet produced by the papermaking system. In order to use this sensor to determine the weight of fiber in a paper stock mixture by measuring its conductivity, the paper stock is in a state such that all or most of the water is held by the fiber. In this state, the water weight of the paper stock relates directly to the fiber weight and the conductivity of the water weight can be measured and used to determine the weight of the fiber in the paper stock.

Formulation of Drainage Characteristics Curves

In this particular embodiment of the invention, three water weight sensors are used to measure the dependence of the drainage profile of water from the paper stock through the fabric on three machine operation parameters: (1) total water flow, (2) freeness of paper stock, and (3) dry stock flow or headbox consistency. Other applicable parameters include for example, (machine speed and vacuum level for removing water). For the case of three process parameters the minimum is three water weight sensors. More can be used for more detailed profiling.

A preferred form of modeling uses a baseline configuration of process parameters and resultant drainage profile, and then measures the effect on the drainage profile in response to a perturbation of an operation parameter of the fourdrinier machine. In essence this linearizes the system about the neighborhood of the baseline operating configuration. The perturbations or bumps are used to measure first derivatives of the dependence of the drainage profile on the process parameters.

Once a set of drainage characteristic curves has been developed, the curves, which are presented as a 3×3 matrix, can be employed to, among other things, predict the water content in paper that is made by monitoring the water weight along the wire by the water weight sensors.

Bump Tests

The term "bump test" refers to a procedure whereby an operating parameter on the papermaking machine is altered and changes of certain dependent variables resulting therefrom are measured. Prior to initiating any bump test, the papermaking machine is first operated at predetermined baseline conditions. By "baseline conditions" is meant those operating conditions whereby the machine produces paper. Typically, the baseline conditions will correspond to standard or optimized parameters for papermaking. Given the expense involved in operating the machine, extreme conditions that may produce defective, non-useable paper is to be avoided. In a similar vein, when an operating parameter in the system is modified for the bump test, the change should not be so drastic as to damage the machine or produce defective paper. After the machine has reached steady state or stable operations, the water weights at each of the three sensors are measured and recorded. Sufficient number of measurements over a length of time are taken to provide representative data. This set of steady-state data will be compared with data following each test. Next, a bump test is conducted. The following data were generated on a Beloit Concept 3 papermaking machine, manufactured by Beloit Corporation, Beloit, Wis. The calculations were implemented using a microprocessor using Labview 4.0.1 software from National Instrument (Austin Tex.).

(1) Dry stock flow test.

The flowrate of dry stock delivered to the headbox is changed from the baseline level to alter the paper stock composition. Once steady state conditions are reached, the water weights are measured by the three sensors and recorded. Sufficient number of measurements over a length of time are taken to provide representative data. FIG. 5 is a graph of water weight vs. wire position measured during baseline operations and during a dry stock flow bump test wherein the dry stock was increased by 100 gal/min from a baseline flow rate of 1629 gal/min. Curve A connects the three water weight measurements during baseline operations and curve B connects the measurements during the bump test. As is apparent, increasing the dry stock flow rate causes the water weight to increase. The reason is that because the paper stock contains a high percentage of pulp, more water is retained by the paper stock. The percentage difference in the water weight at positions h, m, and d along the wire are +5.533%, +6.522%, and +6.818% , respectively.

For the dry stock flow test, the controls on the papermaking machine for the basic weight and moisture are switched off and all other operating parameters are held as steady as possible. Next, the stock flow rate is increased by 100 gal/min. for a sufficient amount of time, e.g., about 10 minutes. During this interval, measurements from the three sensors are recorded and the data derived therefrom are shown in FIG. 5

(2) Freeness test.

As described previously, one method of changing the freeness of paper stock is to alter the power to the refiner which ultimately effects the level of grinding the pulp is subjected to. During the freeness test, once steady state conditions are reached, the water weights at each of the three sensors are measured and recorded. In one test, power to the refiner was increased from about 600 kw to about 650 kw. FIG. 6 is a graph of water weight vs. wire position measured during baseline operations (600 kw) (curve A) and during the steady state operations after an additional 50 kw are added (curve B). As expected, the freeness was reduced resulting in an increase in the water weight (FIG. 6, curve B) as in the dry stock flow test. Comparison of the data showed that the percentage difference in the water weight at positions h, m, and d are +4.523%, +4.658%, and +6.281%, respectively.

(3) Total paper stock flow rate (slice) test.

One method of regulating the total paper stock flow rate from the head box is to adjust aperture of the slice. During this test, once steady state conditions are reached, the water weights at each of the three sensors are measured and recorded. In one test, the slice aperture was raised from about 1.60 in. (4.06 cm) to about 1.66 in. (4.2 cm) thereby increasing the flow rate. As expected, the higher flow rate increased the water weight. Comparison of the data showed that the percentage difference in the water weight at positions h, m, and d are +9.395%, +5.5%, and +3.333%, respectively. (The measurement at position m of 5.5% is an estimate since the sensor at this location was not in service when the test was performed.)

The Drainage Characteristic Curves (DCC)

From the previously described bump tests one can derive a set of drainage characteristic curves (DCC). The effect of changes in three process parameters on the three water weight sensor values provides nine partial derivatives which form a 3×3 DCC matrix. Generally, when employing n number of water weight sensors mounted on the wire and m bump tests, a n×m matrix is obtained.

Specifically, the 3×3 DCC matrix is given by:

$$DC_{Th} \; DC_{Tm} \; DC_{Td}$$
$$DC_{Fh} \; DC_{Fm} \; DC_{Fd}$$
$$DC_{Sh} \; DC_{Sm} \; DC_{Sd}$$

where T, F, S refer to results from bumps in the total water flow, freeness, and dry stock flow, respectively, and h, m, and d designate the positions of the sensors mounted along the fabric.

The matrix row components $[DC_{Th} \; DC_{Tm} \; DC_{Td}]$ are defined as the percentage of water weight change on total water weight at locations h, m, and d based on the total flow rate bump tests. More precisely, for example, "$DC_{Th}$" is defined as the difference in percentage water weight change at position h at a moment in time just before and just after the total flow rate bump test. $DC_{Tm}$ and $DC_{Td}$ designate the values for the sensors located at positions m and d, respectively. Similarly, the matrix row components $[DC_{Fh} \; DC_{Fm} \; DC_{Fd}]$ and $[DC_{Sh} \; DC_{Sm} \; DC_{Sd}]$ are derived from the freeness and dry stock bump tests, respectively.

Components $DC_{Th}$, $DC_{Fm}$, and $DC_{Sd}$ on the DDC matrix are referred to pivotal coefficients and by Gauss elimination, for example, they are used to identify the wet end process change as further described herein. If a pivot coefficient is too small, the uncertainty in the coefficients will be amplified during the Gauss elimination process. Therefore, preferably these three pivotal coefficients should be in the range of about 0.03 to 0.10 which corresponds to about 3% to 10% change in the water weight during each bump test.

Drainage Profile Change

Based on the DCC matrix, the drainage profile change can be represented as a linear combination of changes in the different process parameters. Specifically, using the DCC matrix, the percentage change in the drainage profile at each location may be computed as a linear combination of the individual changes in the process parameters: total water flow, freeness, and dry stock flow. Thus:

$$\Delta DP\%(h,t) = DCTh*w + DCFh*f + DCSh*s,$$
$$\Delta DP\%(m,t) = DCTm*w + DCFm*f + DCSm*s,$$
$$\Delta DP\%(d,t) = DCTd*w + DCFd*f + DCSd*s,$$

where (w, f, s) refer to changes in total water flow, freeness, and dry stock flow respectively, and the DC's are components of the DCC matrix.

By inverting this system of linear equations, one may solve for the values of (w, f, s) needed to produce a specified drainage profile change ($\Delta DP\%(h)$, $\Delta DP\%(m)$, $\Delta DP\%(d)$. Letting A represent the inverse of the DCC matrix, $$\begin{array}{cccc} A_{11} & A_{12} & A_{13} & \Delta DP\%(h) \\ A_{21} & A_{22} & A_{23} & \Delta DP\%(m) = \\ A_{31} & A_{32} & A_{33} & \Delta DP\%(d) \end{array} \begin{array}{c} w \\ f \\ s \end{array} \text{ or}$$

$$w = A_{11}*\Delta DP\%(h) + A_{12}*\Delta DP\%(m) + A_{13}*\Delta DP\%(d)$$
$$f = A_{21}*\Delta DP\%(h) + A_{22}*\Delta DP\%(m) + A_{23}*\Delta DP\%(d)$$
$$s = A_{31}*\Delta DP\%(h) + A_{32}*\Delta DP\%(m) + A_{33}*\Delta DP\%(d)$$

The above equation shows explicitly how inverting the DCC matrix allows one to compute the (w, f, s) needed to effect a desired change in drainage profile, ($\Delta DP\%(h)$, $\Delta DP\%(m)$, $\Delta DP\%(d)$).

Empirically, the choice of the three operating parameters, the location of the sensors, and the size of the bumps produces a matrix with well behaved pivot coefficients, and the matrix can thus be inverted without undue noise.

By continuously comparing the dry weight measurement from a dry end scanner positioned at the take-up reel of the sheetmaking with the water weight profiles measured at sensors h, m, and d, one can make a dynamic estimate of the final dry stock weight will be for the paper stock that is at the position of the dry end scanner.

Dry Stock Prediction

At location d which is closest to the drying section, the state of the paper stock is such that essentially all of the water is held by the fiber. In this state, the amount of water bonded to or associated with the fiber is proportional to the fiber weight. Thus the sensor at location d is sensitive to changes in the dry stock and is particularly useful for predicting the weight of the final paper stock. Based on this proportionality relation:

$$DW(d) = U(d)*C(d),$$

where DW(d) is the predicted dry stock weight at location d, U(d) is the measured water weight at location d and C(d) is a variable of proportionality relating DW to U and may be referred to as the consistency. Further, C(d) is calculated from historical data of the water weight and dry weight measured by the scanning sensor at reel-up.

Subsequent to position d in the papermaking machine, the sheet of stock exits wire 12 and travels into calendaring stack 13 and dryer 14. At location 15, a scanning sensor measures the final dry stock weight of the paper product. Since there is essentially no fiber loss subsequent to location d, it may be assumed that DW(d) is equal to the final dry stock weight and thus one can calculate the consistency C(d) dynamically.

Having obtained these relations, one can then predict the effect of changes in the process parameters on the final dry stock weight. As derived previously the DCC matrix predicts the effect of process changes on the drainage profile. Specifically in terms of changes in total water flow w, freeness f, and dry stock flow s, the change in U(d) is given by:

$$\Delta U(d)/U(d) = DC_{Td}$$

where Ref(cd) is a dynamic calculated value based on current dry weight sensor and historical water weight sensory readings where the α's are defined to be gain coefficients which were obtained during the three bump tests previously described. Finally, the perturbed dry stock weight at location d is then given by:

$$Dw(d) = U(d)*\{1 + [\alpha_T DC_{Td}*w + \alpha_F DC_{Fd}*f + d_S DC_{Sd}*S]\}*Ref(c)$$

The last equation thus describes the effect on dry stock weight due to a specified change in process parameters. Conversely, using the inverse of the DCC matrix one can also deduce how to change the process parameters to produce a desired change in dry weight (s), freeness (f) and total water flow (w) for product optimizations.

It should be understood that various embodiments of sensor array electrode configurations are possible and that the configuration shown in FIG. 3 is one manner in which array electrodes can be configured to obtain water weight measurements.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A measurement apparatus for measuring fiber weight of wetstock on a traveling drainage conveyor in a sheetmaking machine having a wet-end portion comprising:

a means for obtaining water weight measurements of wetstock on said traveling drainage conveyor wherein said water weight measurement means is positioned under said traveling drainage conveyor wherein said water weight measurement means measures the conductivity of the wetstock;

a means for weighing at least said measurement means, and said traveling drainage conveyor without said wetstock to obtain a tare weight measurement in a first case and for weighing at least said measurement means, and said traveling conveyor with said wetstock to obtain a total weight measurement in a second case wherein said means for weighing comprises a device that generates an electrical signal in response to weight applied onto said device and means for converting said electrical signal into at least one of said tare weight and said total weight measurement; and a means for determining fiber weight using said water weight measurements, said tare weight measurement, and said total weight measurement.

2. The apparatus as described in claim 1 wherein said water weight measurement means obtains comprises a plurality of spaced apart sensors that are positioned in a cross-direction of said sheetmaking machine to generate a plurality of water weight measurements.

3. The apparatus as described in claim 1 wherein said means for weighing comprises at least one load cell.

4. The apparatus as described in claim 3 wherein said sheetmaking machine includes a first side and a second side and said water weight measurement means comprises an elongated sensor structure positioned from said first side to said second side, said measurement apparatus further comprising a means for supporting said sensor structure, said support means having first and second ends, and said means for weighing comprises two load cell means one attached to each of said first and second sides for supporting said first and second ends of said support means, respectively.

5. The apparatus as described in claim 3 wherein said sheetmaking machine includes a first side and a second side, said water weight measurement means comprises an elongated sensor structure positioned from said first side to said second side, and said means for weighing comprises a plurality of load cell means positioned beneath said sensor structure, said measurement apparatus further comprising a means for supporting said plurality of load cell means, said support means having first and second ends one attached to each of said first and second sides of said sheetmaking machine, respectively.

6. The apparatus as described in claim 1 wherein said means for determining the fiber weight determines the fiber weight of a portion of the wetstock on said traveling conveyor and the apparatus further comprising means responsive to said water weight measurements of said portion of wetstock for providing a predicted dry stock weight measurement corresponding to said portion of the wetstock on said traveling conveyor and a means for comparing said determined fiber weight to said predicted dry stock weight to evaluate accuracy of said means for obtaining water weight measurements.

7. The apparatus as described in claim 6 wherein said water weight measurement means obtains comprises a plurality of spaced apart sensors that are positioned in a cross-direction of said sheetmaking machine to generate a plurality of water weight measurements.

8. The apparatus as described in claim 6 wherein said means for weighing further comprises at least one load cell means each for outputting an electrical signal in response to weight applied onto said at least one load cell means and means for converting said electrical signal into one of said tare weight measurement and said total weight measurement.

9. The apparatus as described in claim 8 wherein said sheetmaking machine includes a first side and a second side and said water weight measurement means comprises an elongated sensor structure positioned from said first side to said second side, said measurement apparatus further comprising a means for supporting said sensor structure, said support means having first and second ends, and said means for weighing comprises two load cell means one attached to each of said first and second sides for supporting said first and second ends of said support means, respectively.

10. The apparatus as described in claim 8 wherein said sheetmaking machine includes a first side and a second side, said water weight measurement means comprises an elongated sensor structure positioned from said first side to said second side, and said means for weighing comprises a plurality of load cell means positioned beneath said sensor structure, said measurement apparatus further comprising a means for supporting said plurality of load cell means, said support means having first and second ends one attached to each of said first and second sides of said sheetmaking machine, respectively.

11. The apparatus as described in claim 6 wherein said water weight measurement means measures the conductivity of the wetstock.

12. The apparatus as described in claim 1 wherein the sheetmaking machine is a papermaking machine that comprises a moving water permeable web that supports the wetstock.

13. A method of measuring fiber weight of wetstock on a traveling drainage conveyor in a sheetmaking machine that includes a first side and a second side, comprising the steps of:

(a) measuring water weight of said wetstock on a given area of said traveling drainage conveyor by employing a means for obtaining water weight measurements that is positioned under said traveling drainage conveyor and wherein said water weight measurement means comprises an elongated sensor structure positioned from said first side to said second side;

(b) measuring a tare weight with one or more load cells which includes at least a weight of said given area of said conveyor without wetstock on it;

(c) measuring a total weight with one or more load cells which includes at least a weight of said given area of said conveyor with said wetstock on it; and (d) subtracting said water weight and said tare weight from said total weight to obtain said fiber weight.

14. The method as described in claim 13 further comprising the steps of:

measuring a portion of the wetstock on said traveling conveyor;

predicting a dry stock weight of the portion of the wetstock on said traveling conveyor using said water weight measurement; and comparing said obtained fiber weight and said predicted dry stock weight.

15. The method as described in claim 13 wherein the sheetmaking machine is a papermaking machine that comprises a moving water permeable web that supports the wetstock.

16. The method as described in claim 13 wherein said step (a) comprises positioning a plurality of spaced apart sensors that are positioned in a cross-direction of said sheetmaking machine to generate a plurality of water weight measurements.

17. The method as described in claim 13 wherein said steps (b) and (c) each employs at least one load cell means for outputting an electrical signal in response to weight applied onto said at least one load cell means and means for converting said electrical signal into one of said tare weight measurement and said total weight measurement.

18. The method as described in claim 17 wherein said sheetmaking machine further comprises a means for supporting said sensor structure, said support means having first and second ends, and steps (b) and (c) each employs two load cell means one attached to each of said first and second sides for supporting said first and second ends of said support means, respectively.

19. The method as described in claim 18 wherein said sheetmaking machine comprises a plurality of load cell means positioned beneath said sensor structure and a means for supporting said plurality of load cell means, said support means having first and second ends one attached to each of said first and second sides of said sheetmaking machine, respectively.

20. The method as described in claim 13 wherein said step (a) employs a means for obtaining water weight measurements that measures the conductivity of the wetstock.

* * * * *